United States Patent
Lindwurm et al.

(10) Patent No.: US 7,286,687 B2
(45) Date of Patent: Oct. 23, 2007

(54) METHOD FOR GENERATING LEARNING AND/OR SAMPLE PROBES

(75) Inventors: Rainer Lindwurm, Radolfzell (DE); Udo Miletzki, Constance (DE); Gerd Gierszewski, Allensbach (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 11/087,504

(22) Filed: Mar. 24, 2005

(65) Prior Publication Data

US 2005/0163340 A1   Jul. 28, 2005

Related U.S. Application Data

(63) Continuation of application No. PCT/DE03/03149, filed on Sep. 22, 2003.

(30) Foreign Application Priority Data

Oct. 1, 2002   (DE) ................. 102 45 834

(51) Int. Cl.
G06K 9/00 (2006.01)
G06K 9/62 (2006.01)
G06K 9/03 (2006.01)

(52) U.S. Cl. ............... 382/101; 382/161; 382/310

(58) Field of Classification Search ............ 382/101, 382/102, 155–161, 176–182, 209–220, 310
See application file for complete search history.

(56) References Cited

U.S. PATENT DOCUMENTS 5,774,588 A   6/1998   Li
5,796,410 A * 8/1998   Baird .................. 345/471
6,269,171 B1 * 7/2001   Gozzo et al. ............ 382/101

FOREIGN PATENT DOCUMENTS

EP   0 461 793 A   12/1991
WO   WO 00/70549 A1   11/2000

OTHER PUBLICATIONS

Govindan V K et al: "Artificial Database for Character Recognition Research" Pattern Recognition Letters, North-Holland Publ. Amsterdam, NL. vol. 12, No. 10, Oct. 1, 1991, pp. 645-648, XP000230128, ISSN: 0167-8655, Section 2.

(Continued)

Primary Examiner—Matthew C. Bella
Assistant Examiner—Wes Tucker

(57) ABSTRACT

In the present invention information is first defined as a complete description of the meaning of the content, in addition to the required layout of the characters, words, delivery addresses or images of the entire delivery surface, which contains the delivery addresses, as sample elements. The images of the sample elements belonging to the defined reference information are then generated with the aid of type libraries for the defined character fonts and languages and said images are then stored, after having been assigned to the reference information, in the form of a pixel representation for the sample. The images of the sample elements that have been generated in the previous step are subsequently varied by means of known image processing algorithms to create at least one statistical variation corresponding to the previously collected, grouped deliveries, according to the defined sample scope.

4 Claims, 4 Drawing Sheets

OTHER PUBLICATIONS

"Optical Character Recognition Test": IBM Technical Disclosure Bulletin, IBM Corp. New York, US, vol. 36, No. 3, Mar. 1, 1993; pp. 201-202, XP000354749; ISSN: 0018-8689, the whole document.

Miyojim M et al: "Synthesized images for pattern recognition" Pattern Recognition, Pergamon Press Inc. Elmsford, N.Y. US, vol. 28, No. 4, Apr. 1, 1995, pp. 595-610, XP004013174, ISSN: 0031-3203, abstract; figures 11,12.

* cited by examiner

METHOD FOR GENERATING LEARNING AND/OR SAMPLE PROBES

CROSS REFERENCE TO RELATED APPLICATIONS

The present application is a continuation of international application PCT/DE03/03 149, filed Sep. 9, 2003, which designated the United States and further claims priority to German patent application 10245834.0, filed Oct. 10, 2002, the both of which are herein incorporated by reference.

BACKGROUND OF THE INVENTION

The invention relates to a method for generating learning and/or sample probes for optimizing automatic readers of addresses on items of mail with adaptive classifiers.

A large proportion of the processing steps such as, for example, recognition of characters, words and types of script, occurring in an address reader are based on adaptive classification methods. The basic principle which all the adaptive methods have in common is learning previously collected patterns whose properties are mapped onto quantifiable feature sets. They permit conclusions to be drawn about class membership later. For this reason, adaptive methods basically have two working phases:

a) the optimization phase, composed preferably of the learning phase and test phase,
b) the can phase.

During the optimization phase, each feature set of a pattern which, depending on the task, is composed, for example, of a character, a word or an address, must have its meaning added to it in the form of the reference information so that the determination variables of the classification system can be set in an optimum way. This phase in which the system moves towards the optimum parameter setting preferably takes place in two stages with the basic setting of the parameters being performed in the learning phase while fine adjustment of the parameters takes place in the test phase. In the can phase, all that is then needed is the feature set of a pattern from which the classification system derives the class membership in accordance with the stored parameters.

The greatest degree of expenditure involved in the technical development of a classification system is incurred in the learning and test phases which can each in turn be divided into two main activities. Firstly, it is necessary to prepare a sample which satisfactorily represents the recognition task. This is followed by the actual adaptation of the classification system which, depending on the classification method and classifier design, concentrates on the optimization of the underlying determination variables such as, for example, optimization of the classifier coefficients for the polynomial classifier, optimization of the weighting factors for the neural network or the selection of the most efficient reference vectors for the nearest neighbour classifier.

While the second aspect of the learning and test phases can largely take place in an automated fashion since it is generally based on well defined mathematical methods and optimization methods, the first aspect entails a large amount of work on planning, research and checking, which often becomes the actual sticking point of adaptive solution methodology.

In order to assemble the samples, according to the prior art large quantities of items of mail (life mail) are collected in situ and provided manually, by so-called labeling, with the reference information (meaning of the addresses, layout data). The original reference information/meaning which has been lost therefore has to be inferred from an image. (Jürgen Schüirmann: Pattern Classification, Verlag [publishing house]: John Wiley & Sons, Inc., 1995, Chapter "Introduction Learning", pp. 17-21).

The process of assembling the sample is of decisive significance for automatic recognition for a wide variety of reasons since its quality has a direct effect on the efficiency of the subsequently adapted classification system. If the respective sample reflects the reading task under consideration sufficiently well, a good reading performance for the wide range of samples which occur will also occur in the can phase. If too narrow a sample is selected, a good performance can also be expected in the can phase only for this restricted range and the anticipated performance for the rest of the patterns which occur is not achieved. This aspect of the sufficiently comprehensive sample correlates directly to the term of representativeness of a sample from the mathematical statistics.

In order to obtain a high quality and representative sample a series of criteria have to be fulfilled. A basic precondition for a good learning and test sample is that all the forms of a pattern class which have to be learnt are present to a sufficient degree. This is often already a condition which is difficult to fulfil since task definitions usually come from a specific application which represents only a portion of an overall recognition task. For example, in the region of script detection in the field of mail certain fonts, printing techniques or printing equipment which represent only a limited portion of the entire range have preference at the time when a classifier is adapted. In the course of the service life of a device for reading the addresses on items of mail other fonts and printing techniques will probably come to predominate and must nevertheless still be sufficiently well recognised. This aspect often varies when such techniques are used in different national areas. In a country with a high level of technology, the fonts and printing equipment and writing equipment which are used will be entirely different from that in a developing country. This requires the sample to be collected in as far-cited a way as possible and necessitates as wide a basis as possible for the generation of patterns.

In applications for items of mail it is often impossible to find sufficient examples for a specific task definition, for example rarely occurring characters, for example "Q" in the German language or a rare company logo. Categories from the field of postal applications are quickly formulated and corresponding algorithms quickly generated but it is frequently impossible to check them in a meaningful way this sorting of existing stocks of the sample do not contain any examples of the required class at all or do not require a sufficient number of them.

Next, the true meaning which is assigned to a pattern must apply. If, in fact, an adaptive system too frequently assigns the false class memberships to a pattern, it will increasingly make the wrong decision in the can phase if corresponding patterns are presented. The system is simply adaptive and also learns incorrect things if they are offered to it. The smaller the incorrect detections in the learning or test sample, the better the efficiency of the developed classification system also.

A further aspect relates directly to the generation of the feature sets. The feature sets are usually generated with the detection algorithms which are contained in the reading software which is present since the amounts are still considerable (for example several thousand examples per character in the case of character recognition), and the features are to be as close to conditions in reality as possible.

However, the algorithms which are present do not operate without faults. For example, during character segmentation incorrect segments occur which, instead of containing one character, contain only parts of characters or contain more than one character or even sometimes contain only interference which is not only irrelevant for an adaptation but is also hugely disruptive since they are very confusing for the classification system.

Furthermore, within a pattern recognition process an entire series of processing steps occur which are not visibly determined and cannot be perceived visibly but rather have to be handled in a summary statistical fashion. This includes, for example, quantisation effects as a result of binarisation process, contrast variations as a result of different colored paper backgrounds, rounding effects as a result of different resolution algorithms and scanning algorithms in scanning and printing equipment and scanning and printing quality fluctuations as a result of age and different maintenance states of the equipment.

All this explains the previous difficulties and the large amount of effort dedicated to optimizing automatic readers of addresses on items of mail.

SUMMARY OF THE INVENTION

The invention is based on the object of providing a method for generating learning and/or test samples for optimizing automatic readers of addresses on items of mail with adaptive classifiers, with which the samples can be produced in a short time and with a low amount of expenditure in terms of personnel and can easily be adapted to the respective classification tasks.

The present invention is characterised in that reference information is defined as a complete description of the meaning of the content and of the required layout of the characters, words, addresses on the items of mail or images of the entire surfaces of the items of mail, containing the addresses on the items of mail, as sample elements of the sample in accordance with the adaptation task. This is followed by the generation of the images of the sample elements which are associated with the defined reference information, using the script libraries for the defined types of script and languages and storage of the generated images, assigned to the reference information, in a pixel representation for the sample. Then, the images of the sample elements generated in the previous step are varied by means of image processing algorithms which are known per se, in order to generate at least one statistical set corresponding to the previously collected and assembled items of mail according to the defined scope of the sample. The variants which are generated in this way are then stored in pixel representation for the sample with an assignment to the reference information. The reference information which represents a complete textual and geometrically arranged description of image objects of a learning and/or test sample element which is being considered triggers the generation of learning samples. It is possible to dispense completely with the previously customary complex collection, scanning and labeling of physical items of mail of a sample at the customer's premises with the intermediate carrier of paper as the variance-modeling intermediate step. The learning sample elements are always characterized with the true meaning, i.e. there are no label errors. This ensures the maximum learning effect.

Advantageous embodiments of the invention are represented in the subclaims.

It is thus advantageous to scan the character images which are present in the script fonts in a polygon description and to place them in a suitable pixel format.

It is also advantageous to generate variants in a pixel representation by repeated scanning of the character images in a polygon description, and store them in the sample.

In order to generate a simulation of the paper-bound sample generating process which is as realistic as possible, as the images of the characters, words or addresses on items of mail vary interference processes and wear processes which occur during conventional printing of the addresses on the items of mail and during later optical scanning as well as variations in the quality of the paper are simulated.

The changing of the character variables, character inclination and execution of character distortions in order to vary the images of the characters is advantageously carried out in the polygon representation.

It also advantageous to carry out changes to the metric, the line inclination and the spot noise in order to vary the images of the words or addresses on the items of mail.

Objects which are stored in an object image library are advantageously accessed in order to generate the images of the surfaces of the items of mail with the addresses on the items of mail.

BRIEF DESCRIPTION OF THE SEVERAL VIEWS OF THE DRAWINGS

The invention will be described in more detail below in an exemplary embodiment with reference to the drawings, in which.

DETAILED DESCRIPTION OF THE INVENTION

The solution according to the invention fulfils the following requirements which are made for a high quality sample for learning or testing:

provision of the variety of shapes/types which are necessary for the task definition, provision of the variety of layouts which are necessary for a type definition, allocation of reference identifiers, exclusive generation of useful feature sets, and algorithmic simulation of the variety of features which is typical of applications.

Figure 1:
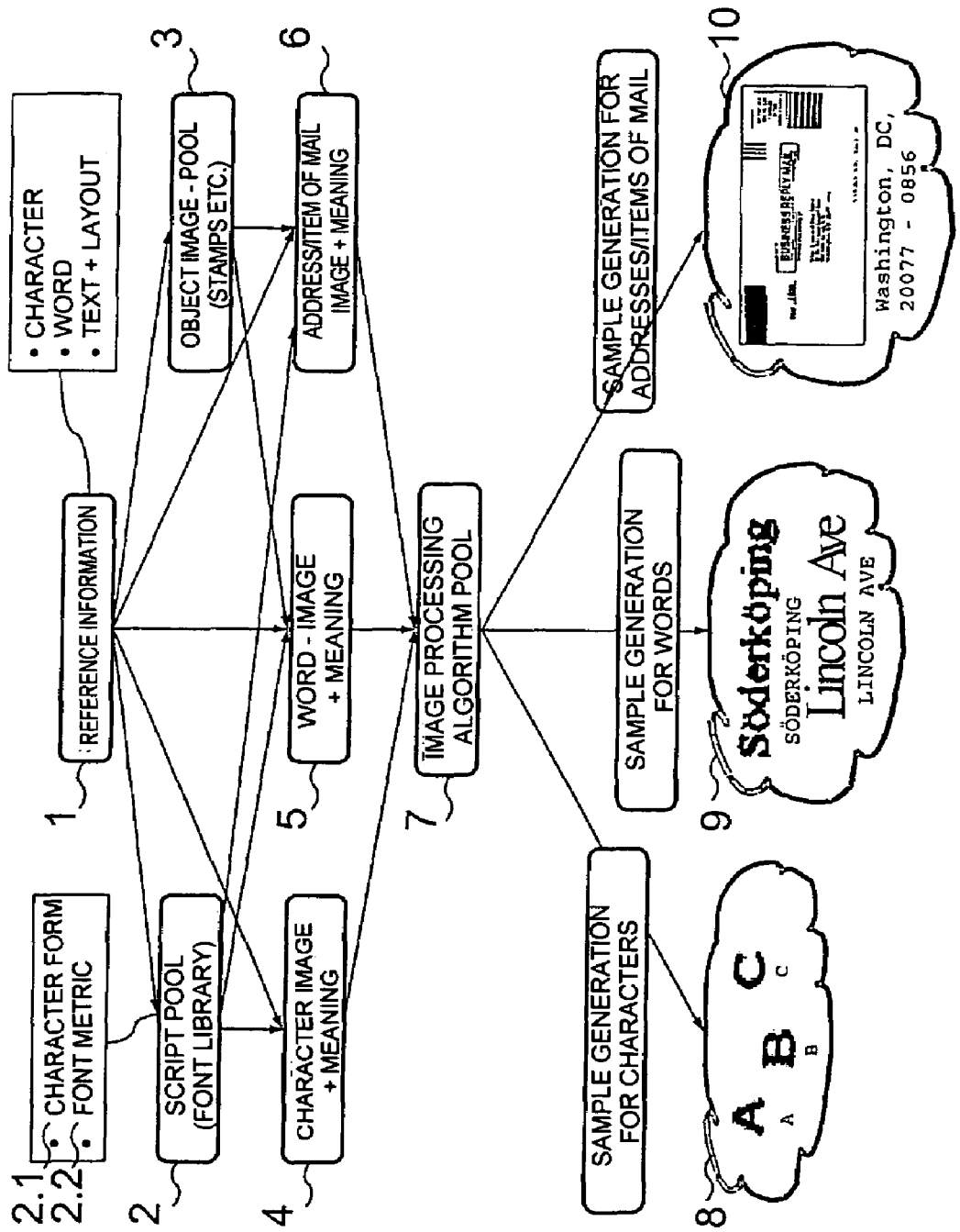
FIG. 1 is a structural diagram of the generation of samples.

This is closely related to the fact that paper is dispensed with as the customary carrier—as is the source of the need to deal with printers and scanners—which ultimately considerably reduces the deployment of personnel for generating samples. For the field of postal or other document applications, four initial sets have to be considered, as illustrated in FIG. 1. These are the reference information 1, the script pool 2, the object image pool 3 and the image processing algorithm pool 7. In this context, the scrip pool 2, object image pool 3 and image processing algorithm pool 7 are products which can either be purchased on the market or are provided free of a software licence, and algorithms. Only the reference information 1 is, of course, internal to the company from the word level since without exception it has to be implemented in a task-specific, and thus flexible, way.

The script pool 2 which is composed of a collection of a very wide variety of font libraries with many hundreds of fonts (Arial, Times, Universe . . . ) in different formats (PostScript type 1, TrueType, Metafont, IK, . . . ) and various languages (Latin, Greek, Cyrillic, Arabic, Hindy, . . . ), ensures, for example, that there is a variety of shapes/types of a character sample, word sample or text sample. Each font library is composed of at least the actual collection of forms of character 2.1, which stored either in an outline description or are stored after having already been directly scanned, the font metric information 2.2, which contains the type setting information such as, for example, spacing, underlining and kerning which is essential for generating realistic word images and text images.

The reference information 1 contains at least three different reference information types which deal with the main application areas of character sample 8, word sample 9 and item of mail/document sample 10. The reference information is used in two ways. Firstly for generating complex image components such as word image, item of mail image or document image, and secondly for the actual assignment of reference identifiers, which of course only constitutes a learning sample or test sample with which adaptation and testing can be carried out. At first this is the information of a character code which can be used to address a specific character of a font. This information serves simultaneously as reference information—the true meaning which, together with the character image, forms an element 4 of the learning sample for individual characters. This is followed by the word information which, in its simplest manifestation, can be a pure Ascii list of the words to be generated. This list controls the character code vector set which is necessary to generate the word image and at the same time constitutes reference identification information to precisely this word image 5. The text and layout information remains the last, said information containing 6 containing both the purely textual and geometrical information of all the elements involved in the document, for example characters, lines of characters, object images, lines etc. If this layout information is fine enough and covers all the individual objects it is possible, on the one hand, to implement any desired arrangement of these individual objects pictorially and also carry out subsequent testing in test situations in order to detect recognition performance levels at every examination level. As a result of this procedure it is also possible to generate learning and test samples which are in principle conceivable for a recognition task but cannot be found in test decks which are taken from the process. In this way it is also possible to implement functional test sets for degrees of coverage which were previously impossible.

The object image pool 3 is used to combine all the elementary object images which cannot be acquired from font libraries. The object image pool 3 can be either a separate collection of object images such as, for example, stamps, air mail registration stamps or registered mail stamps or libraries with elementary object images from completely different application areas such as, for example, electrical circuit symbols, technical symbols or safety symbols. By using such an object image pool it is then possible to create any desired templates for items of mail and documents.

Linking the generation of images directly to the reference information assignment also naturally ensures that the reference information is automatically correct. With the new proposed procedure errors no longer occur in the generation of learning/test samples which, owing to inadequate algorithms of the recognition sequence, have caused previously unavoidable incorrect recognitions and have produced huge quantities of useless segmenting information which then had to be laboriously eliminated again.

As a result of the initial sets described above and their skilful connection to learning/test sample generation process, the first four of the five criteria specified at the beginning have now already been taken into account. The last initial set, the image processing algorithm pool 7 then ensures that the last criterion also comes into play. Two main application directions are to be assigned to this pool:

Scanning of the image objects (in polygon description)

Formation of variants on the image object.

The term image object conceals both simple and complex image objects. A simple image object is understood, for example, as being a character image which can be acquired directly from a font file. If such a simple image object is already a desired element of a sample, the scanning is performed in one of the known complex pixel formats pk, bdf or sgml. A complex image object is a combination of all the images which contain word information, item of mail information or even any document information. Such images are stored, after previous composition from the individual elements, in a more general image format such as Tiff or one of the variants of the pnm family.

The variants formation is carried out separately from the scanning of the image information. Said information can itself be divided into two main categories. Firstly, during the real recognition process shape deformations owing to the very variable use of the script size, differently selected running widths (condensed, expanded), differently set or differently available resolutions of the scanning equipment and printing equipment as well as small rotations of the script lines as a result of dynamic effects result in considerable variations in the basic forms. On the other hand, the paper quality used, the color of the paper, the binarisation algorithms used, the age and the maintenance state of scanning equipment and printing equipment produce further inexhaustible source of additional deviations in basic shapes which have to be processed. While the first part of the causes of variants are of a more systematic nature which can be readily simulated via algorithmic measures, the other part is much more difficult to access and can only be overcome in an adaptively simulative fashion. For both variation categories there are sufficient algorithms which can be used to generate deviations which can be sufficiently used in reality from the rather exemplary set of basic forms so that they satisfy the set requirements of a statistically significant learning/test sample.

The variants-producing algorithms can operate both on the polygon description and on the pixel representations, with the variations which are intrinsic to the script, such as sizes of script, rotation and distortions operating more on the polygon description, while the environment-dependent variations such as influences of the paper, printing quality and equipment maintenance are to be introduced in a more pixel-specific fashion.

The actual learning/test sample generating process than takes place as a function of the desired type of learning/test sample (character—word—item of mail/document).

The simplest case is the generation of a pure individual character sample 8. Only the character images 2.1 from a selected script pool 2 and the desired reference information 1 in the form of the character codes are required for this. Since the referencing information is required directly to select the desired character image set, and the reference image assignment is also made precisely at this time, it is in principle error-free. Desired and available variant algorithms from the image processing algorithm pool 7 are then applied to the character image and converted to an independent or known pixel format, for example bdf . . . , if the fonts are in the polygon description. As a result, a learning/test sample probe is obtained which is close to reality with respect to the scope of the sample and embodiment of the sample and defines the task.

Since variant aspects are adequately modeled by electronic means it is possible to dispense with the intermediate carrier of paper, permitting immediate further use for the actual adaptation and test purposes.

Figure 2:
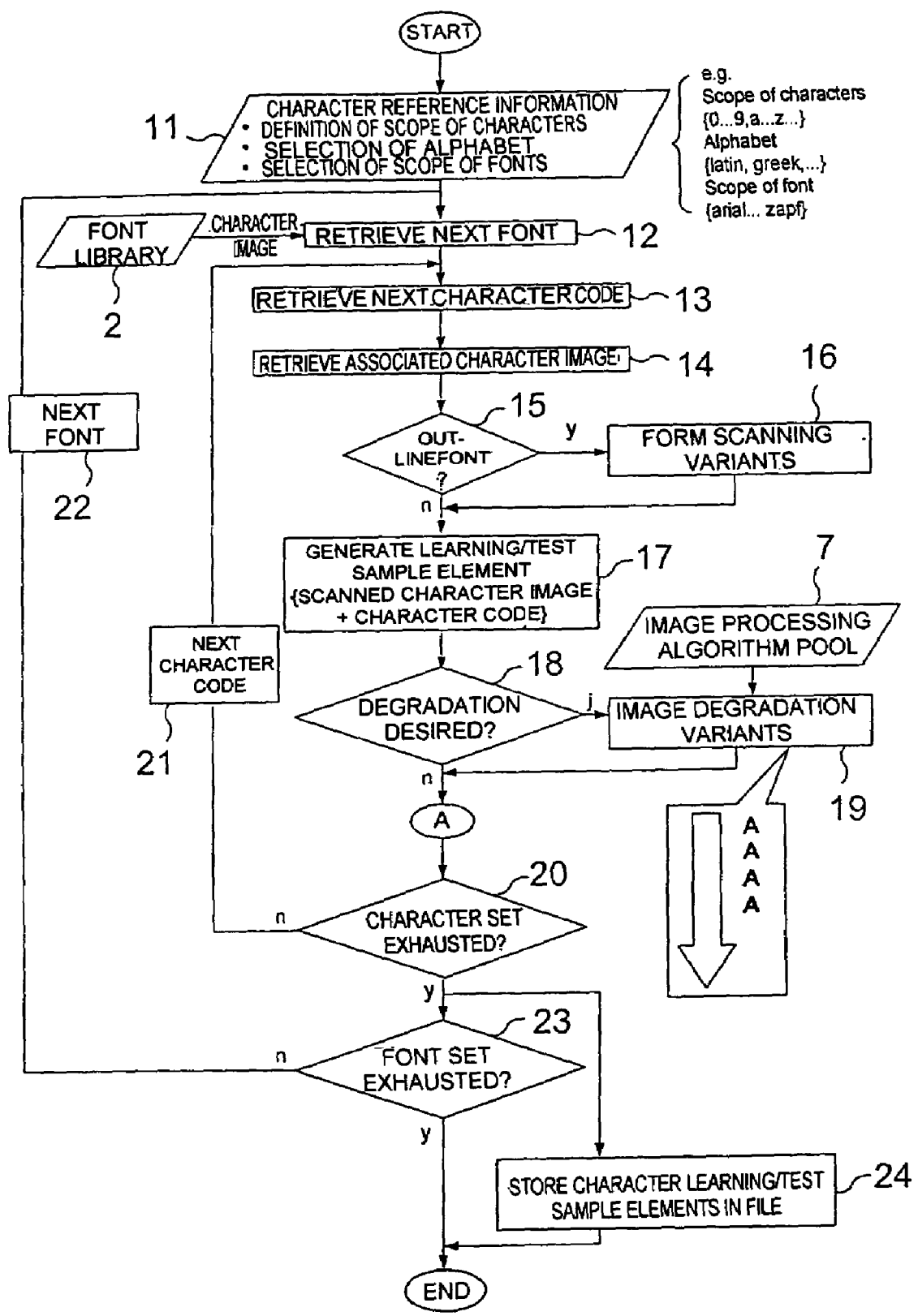
FIG. 2 is a flowchart of the generation of samples of characters.

In particular, the generation of samples for characters proceeds as follows (FIG. 2):

Firstly, the character reference information is defined 11 (definition of the scope of the character, selection of the alphabet, selection of the scope of the font). Correspondingly, the first font is retrieved 12 from the font library 2 and the associated character image is retrieved 14 for the first character code 13 from the character reference information 11. If the character image is present in an outlined description 15, it is scanned 16 once or repeatedly in order to generate variants of the scanned character images to the desired degree for this character code and thus to generate 17 the sample elements. If the character image is already present in a pixel representation, a sample element is generated 17 from it using the character code. If degradation of the character images in the pixel format is then desired 18, for example in order to simulate wear, contamination of printers, scanners, further sample elements for this character code are generated 19 from the image processing algorithm pool 7 using corresponding algorithms.

The described steps for the other character codes of this font are then carried out 21, specifically until the character set is exhausted 20. The sample elements are then stored 24 in a file.

The procedure is then carried out for further fonts 23 which have to be read until the font set is exhausted 22.

Figure 3:
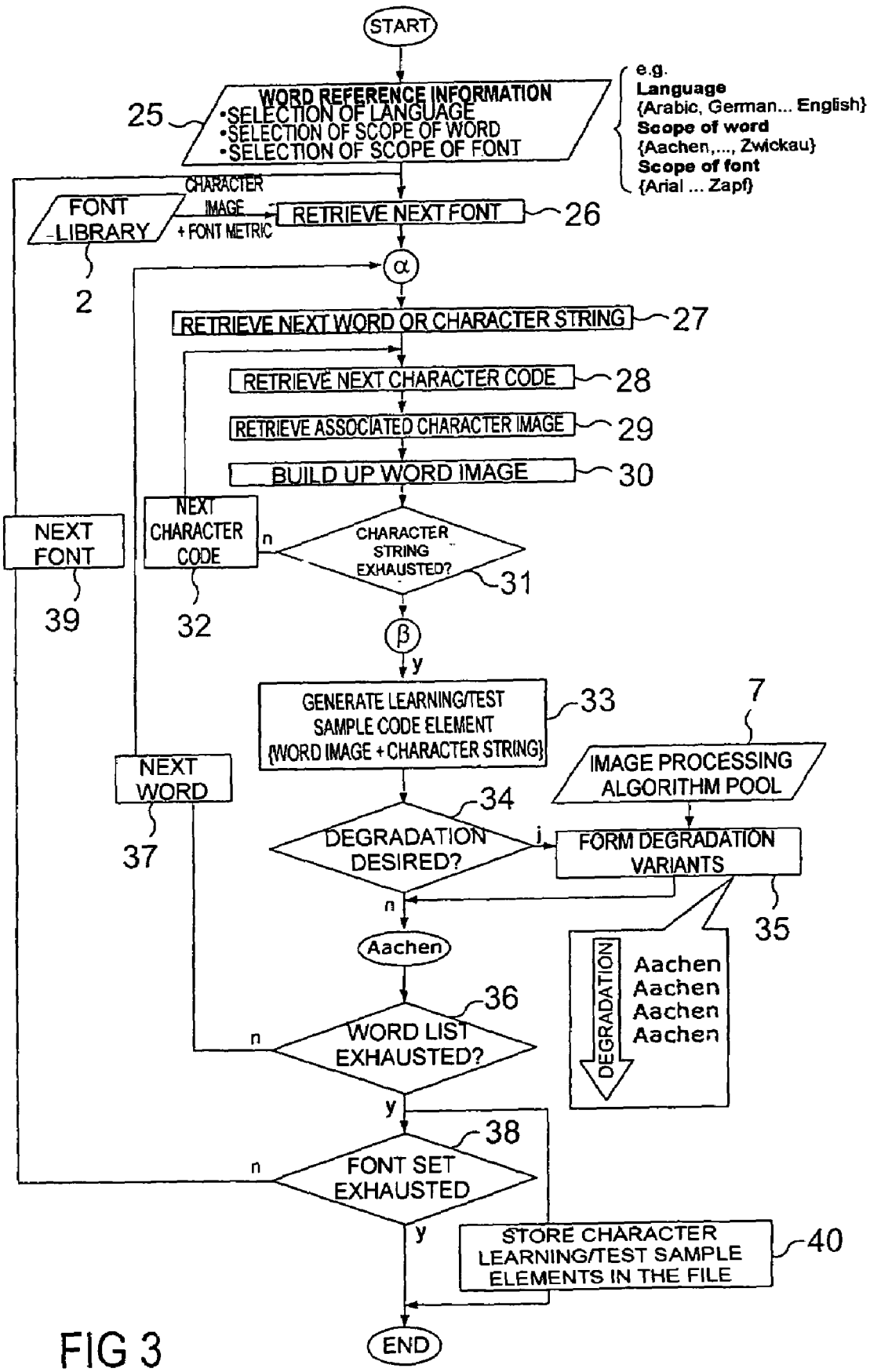
FIG. 3 is a flowchart of the generation of samples of words.

The sequence when creating the word sample 9 is similar. Starting from the reading task, the word reference information 25 is defined, for example, in the ASCII format (selection of the language, of the scope of the word, of the scope of the font) and the store is a character string (FIG. 3). The first font, composed of the character images with the assigned character code and the font metric, is then retrieved 26 from the font library and then the first word or the first character string 27 are subsequently retrieved and then the first character code 28 for it. The corresponding character image is assigned 29 to this character code and the word image is successively built up 30 using the font metric, and the next character codes 32 are then retrieved 28 until the character string is exhausted 31. A sample element is generated 33 from this word image using the associated character string. If degradation of the word image is additionally desired 34, image variants are generated 35 using the image processing algorithm pool 7. Variance-increasing measures can then be carried out here both on the individual character level, as described, and on the entire word image. Increases in variants on the entire word image are, for example, font metric variations, line inclination, spot noise etc.

If the word list of the word reference information is not yet exhausted 36, the next word 37 is retrieved 27 and the described sequence is carried out until the word list is exhausted. The word images with the associated character strings are then stored as sample elements in a file in the customary image format such as Tiff or PostScript 40. If the font set is still not yet exhausted 38, the next font 39 is retrieved 26 and further sample elements are, as described, generated for all the words of the word list.

The elements of an item of mail image sample 10 are now composed of a collection of a plurality of text image parts. For postal applications customary information of an address are, for example, town names, street names, names of addressees and names of senders. The text parts are generated in accordance with the word images of the word sample 33. Textual contents, placing and dimensioning of the address image objects are defined in a corresponding address reference information item (definition of the address string—and of the scope of the address layout, selection of the language and of the scope of the font). The finer the textual and text-pictorial subdivision, the greater the possible variation possibilities will, of course, be later for the entire address image. This is particularly important if the intension is to carry out carefully targeted testing of algorithms which are for the purpose of finding specific parts of an address. For this reason, it is to be ensured that the reference information structure is as flexible as possible, said structure being best kept in a tagged format such as, for example, HTML or XML. The process of the generation of address images is also controlled here by the address reference information and the correct reference information can thus also be assigned without errors to the individual address elements here when generating address images. Variations of the address image are possible here in all three levels (character—word—address). At the address image level, in addition to the variation of the positioning information all the variations which simulate possible dirt and noise effects by means of image processing methods for image files give rise to a virtually inexhaustible variety of sample variants which it was impossible to obtain using the previous method of collecting samples in situ.

Figure 4:
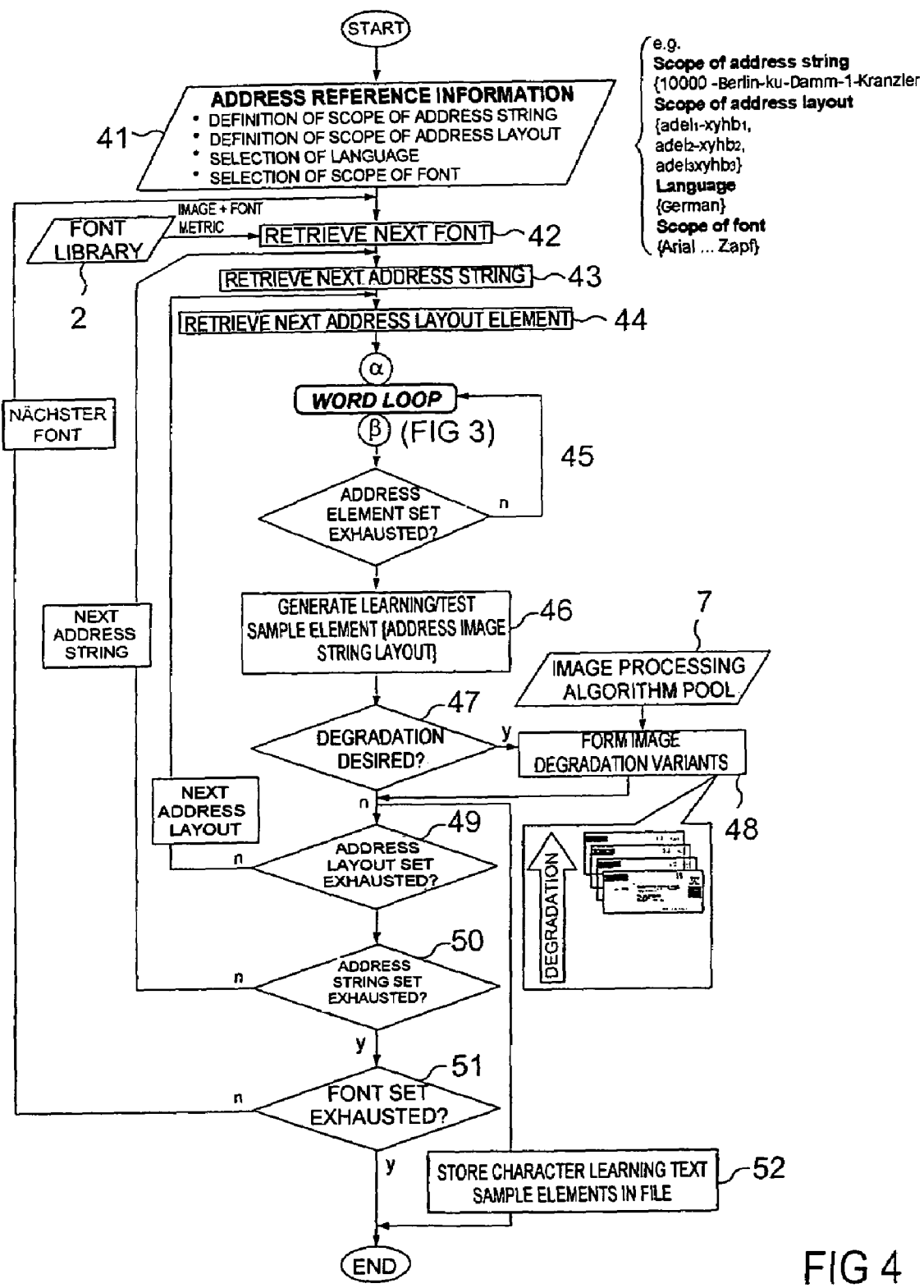
FIG. 4 is a flowchart of the generation of samples of addresses.

The sequence in particular is carried out according to FIG. 4 as follows:

After the address reference information has been defined (definition of the scope of the address string, definition of the scope of the address layout: which parts of the address are located where and with which dimensions in the address image, selection of the language and of the scope of the font) 41, one of the reference fonts is retrieved 42 from the front library, an address string and an address layout element are retrieved 43, 44 and the word loop is processed according to FIG. 3 until the address element set for this address string is exhausted 45. This is followed by the generation of the corresponding sample element (reference information, address image, string, layout) 46 and the storage in a file 52. If degradations are desired 47, degradation variants are generated 48 using the image processing algorithm pool and are also stored 52 with the reference information in a file. If the address layout set is not yet exhausted 49, the next address layout element is retrieved 44 and sample elements are also generated with this font and address string and stored. When the string set is exhausted 50, the next address string is retrieved 43 and the generation/storage of the sample elements with all the address layout elements takes place as described. If all the address strings have been processed 50, a new font is retrieved 42 from the front set and the procedure is carried out with all the address strings and address layout elements as described. The generation of samples is terminated when the generation of samples has been carried out with all the fonts and the font set is exhausted 51.

A natural extension of an address image sample is the random item of mail image sample (10), composed of a set of text and object image parts.

For postal applications, the text parts may be, for example, addresses of addressees or of senders, while stamps, express registration stamps and registered mail stamps, for example, are possible image objects. The textual content, positioning and dimensioning of all the individual objects are contained in the item of mail reference information which represents an extension of the address reference information with the addition of the categories of scope of object images from the object image pool 3 and scope of layout of the object images. In addition to the generation of address images and the provision of all the desired object images for any desired item of mail image, the corresponding item of mail images are generated starting from the item of mail reference information about the scope of the layout variants and degradation variants.

The invention claimed is:

1. A method of selectively generating learning and/or test samples for characters, words, addresses on mail items and images of entire surfaces of mail items including the addresses on the mail items and pictorial object image elements for optimizing automatic readers of addresses on mail items, comprising:

providing a script pool comprising a plurality of font libraries containing a plurality of fonts in different formats and various languages;

providing an object image pool comprising images of elementary pictorial objects not acquired from said font libraries;

providing an image processing algorithm pool comprising variants-producing algorithms;

selecting an adaptation task to determine a kind of learning and/or test samples to be generated, said kind selected from characters, words, addresses on mail items and elementary pictorial images of entire surfaces of mail items;

if the adaptation task is to generate samples for characters, based on said script pool, defining character reference information comprising a selection of a scope of characters, a selection of an alphabet, and a selection of a scope of fonts;

if the adaptation task is to generate samples for words, based on said script pool, defining word reference information comprising a selection of a language, a selection of a scope of words, and a selection of a scope of fonts;

if the adaptation task is to generate samples for addresses on mail items and images of entire surfaces of mail items, based on said script and object image pools, defining address reference information comprising a definition of a scope of address strings, a definition of a scope of address layouts, a selection of a language, a selection of a scope of fonts and a selection of elementary pictorial objects; wherein said character reference information, word reference information and address reference information each include a complete description of meaning and required layout of characters, words, addresses and pictorial images on items of mail;

depending on the adaptation task generaling images of sample elements associated with the respective reference information so that for each generated image of a sample element a true meaning as defined by the respective reference information is available;

storing the generated images, assigned to the reference information, in pixel representation for the sample elements;

varying the images of the sample elements by means of said image processing algorithms for generating at least one predetermined statistical variation; and storing the generated variations, assigned to the reference information, in pixel representation for the sample elements.

2. The method as claimed in claim 1, wherein, when images of the characters, words or addresses on items of mail are varied, interference and wear processes occurring when the addresses on the items of mail are printed conventionally and when later visual scanning is carried out are simulated.

3. The method as claimed in claim 1, wherein, in order to vary the images of the characters in a polygon representation, the sizes of the characters and inclinations of the characters are changed and character distortions are implemented.

4. The method as claimed in claim 3, wherein, in order to vary the images of the words or addresses on the items of mail, changes are made in the metric, the inclinations of the lines and the spot noise.

\* \* \* \* \*